March 8, 1949.　　　　I. M. COWAN　　　　2,463,854
FRUIT PITTER
Filed Nov. 2, 1945
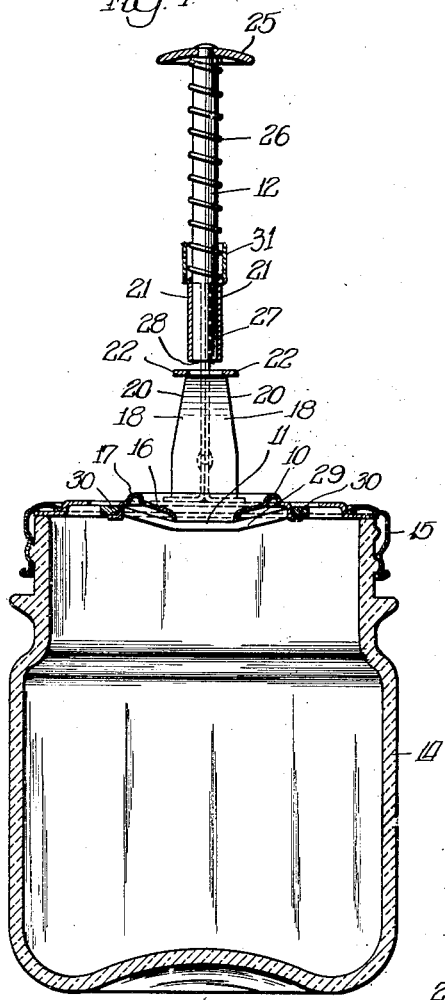
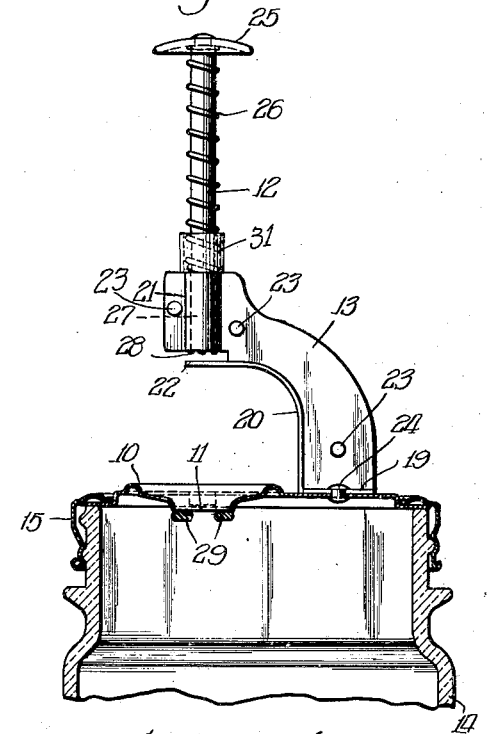
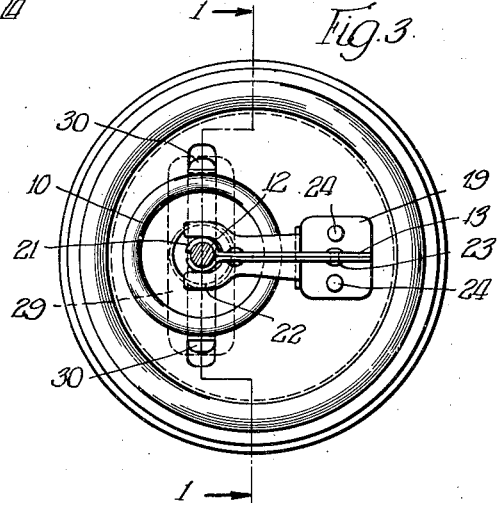
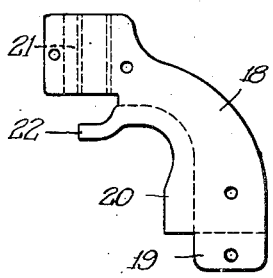
INVENTOR.
Irma M. Cowan,
BY
Cromwell, Greist & Worden
ATTYS Patented Mar. 8, 1949

2,463,854

UNITED STATES PATENT OFFICE 2,463,854

FRUIT PITTER

Irma M. Cowan, Chicago, Ill.

Application November 2, 1945, Serial No. 626,203

3 Claims. (Cl. 146—19)

My invention is concerned with improvements in a device for use in removing seeds or pits from fruit such as cherries, or the like.

It is an object of my invention to provide a simple device which may be used to remove quickly and easily the pits from cherries, or the like, with a minimum of handling and without the waste of the fruit attendant upon ordinary hand pitting operations.

It is an object of my invention to provide a device which may be attached to a receptacle such as a fruit jar upon which a cherry or similar fruit may be placed and the pit removed neatly and readily by a simple operation of the device to prepare the cherry for canning or other uses.

It is an object of my invention to provide a device which may be readily attached to a receptacle or other support comprising an apertured member and a normally operable reciprocable plunger aligned with the aperture in said member for removing pits from fruit placed over the aperture.

It is a further object of my invention to provide in a device of the character described stripping means to prevent the pit from clinging to the fruit after it is removed therefrom and to prevent the fruit from clinging to the plunger after it is retracted.

These and other objects will be apparent from a description of the preferred embodiment of my device which is illustrated, by way of example, in the accompanying drawings, wherein:

Fig. 1 is a longitudinal section through my fruit pitter attached to a conventional fruit jar;

Fig. 2 is a side elevation of my pitter with the base portion and the fruit jar to which it is attached shown in section;

Fig. 3 is a plan of my pitter with parts shown in section; and

Fig. 4 is a detail view illustrating how the plunger supporting members are formed.

The preferred form of my device comprises a plate-like supporting member 10 having an aperture 11 therein, and a plunger 12, supported in vertical alignment with the aperture 11, by a bracket 13. As illustrated, the supporting member 10 is circular and constructed of a size to fit on the top of a conventional fruit jar 14 and to be retained thereon by the conventional screw cap retaining member 15, which is commonly supplied with a separable glass center, or insert, to provide a top closure for the jar. The supporting member 10 is designed to be substituted for the glass insert member and the jar 14 then becomes a receptacle for the pits in the fruit pitting operation. The aperture 11 is surrounded by upwardly curved surface 16 terminating in a bead-like portion 17 to form a concave or cup-like surface around the aperture 11 for supporting the fruit in proper position for the pitting operation.

The plunger supporting bracket 13 comprises two parts 18 which are each formed from a blank (Fig. 4) wherein there is provided a lower flange portion 19, a vertical flange portion 20, and a sleeve portion 21. The bracket 13 is formed by bending flange portions 19, 20 outwardly and shaping the portion 21 to form half of a sleeve on the two parts 18, then securing the two parts in face-to-face relation. The flange 20 of each part 18 is provided with an offset extension 22 which cooperates with a like member on the other part to form a stripper immediately beneath the sleeve portion 21. The parts 18 are secured by rivets 23 or the like to form the bracket 13 and the flanges 19 are secured by rivets 24 to the plate member 10.

The plunger 12 is provided with a striking head 25 and a spring 26 which normally retains it in retracted position. The lower end 27 of the plunger 12 is spread outwardly slightly at 28 to prevent it from moving upwardly into the sleeve 21 and provided with a relatively sharp serrated edge to more readily cut into the fruit. A loose tubular sleeve 31 is provided to limit the downward movement of plunger head 25 and allow necessary space for the spring 26 when it is compressed by downward movement of the plunger 12.

A seed stripper is provided which comprises a rubber band member 29 arranged on two lugs 30 which may be punched out or otherwise provided for on the supporting plate 10.

The fruit is pitted by placing it in the cup-shaped recess over the apertures 11 and striking the top 25 to drive the end 27 of the plunger 12 down through the fruit and the aperture 11, carrying the pit ahead of it into the receptacle 14. The spring 26 retracts the plunger 12 when the plunger is released. The stripper 29 will prevent the pit from returning with the plunger end 27 and also prevent the pit from clinging to the fruit when it is removed from the device. The stripper 22, 22 will strip the fruit from the plunger end 27 if it is carried upwardly with the same. The receptacle 14 functions as a collector for the pits and also for juice which may be extracted in the pitting operation.

I contemplate manufacturing my pitter by the use of thin metal parts and simple stamping and riveting operations, but it will be understood that other materials and other details of construction within the scope of my invention may be resorted to.

I claim:

1. A fruit pitting device comprising an apertured plate, a rigid curved bracket extending above said plate and having its base portion secured to said plate laterally of the aperture therein, said bracket being formed by angled plate members secured in face abutting relation to provide a rib-like body portion and laterally extending reinforcing flanges, the end of the rib-like portion of said bracket being positioned above the aperture in said plate and being shaped to provide a vertically arranged sleeve in alignment with the aperture in said plate, the reinforcing flanges at the upper end thereof extending below the end of the sleeve and being cut away to provide stripper elements a plunger mounted for reciprocation in said sleeve, and a spring on said plunger normally holding the end of the same in spaced relation to the aperture in said plate whereby when the fruit is placed over said aperture and said plunger end is moved toward said fruit the end thereof will pass through the fruit and drive the pit through the aperture.

2. A device for use in pitting fruit or the like which comprises a receptacle for receiving the pits, a cover member therefor having an aperture therein, a bracket mounted adjacent the aperture in said cover, and a reciprocable plunger carried be said bracket, said bracket comprising a multiply curved rib-like body portion and outwardly extending reinforcing flanges on the inner edge thereof, the top end of said body portion being provided with a sleeve formation for receiving said plunger in aligned relation with said aperture, a spring on said plunger normally holding the end of the same spaced from said aperture whereby a fruit may be placed over said aperture and the plunger reciprocated to enter the fruit at the top and drive the pit out of the fruit and through the aperture into the receptacle, said cover having slightly spaced parallel resilient flexible elements beneath said aperture for preventing the pit from clinging to the plunger, and said reinforcing flanges being cut away at said sleeve formation to provide stripper elements for preventing the fruit from clinging to the plunger upon return movement of the plunger.

3. A fruit pitting device comprising an apertured plate adapted to be positioned on the top of a receptacle, a rigid bracket having its base mounted on said plate laterally of the aperture therein, said bracket having an upwardly and outwardly extending multi-ply body portion and reinforcing flanges extending laterally of an edge thereof, said body portion having its upper end projecting over the aperture in said plate and being provided with a plunger receiving and guiding formation, a reciprocal plunger mounted in said receiving and guiding formation, a spring on said plunger normally holding the end of the same spaced from said aperture, and stop means adjacent the end of said plunger limiting its upward movement, the upper ends of said reinforcing flanges terminating adjacent the end of said plunger and forming means for preventing the fruit from clinging to said plunger as it is retracted by said spring.

IRMA M. COWAN.

REFERENCES CITED

The following references are of record in the file of this patent:

UNITED STATES PATENTS

| Number | Name | Date |
| --- | --- | --- |
| 440,463 | Bryan | Nov. 11, 1890 |
| 686,139 | Rollman | Nov. 5, 1901 |
| 2,097,756 | Brown | Nov. 2, 1937 |

FOREIGN PATENTS

| Number | Country | Date |
| --- | --- | --- |
| 388,338 | France | May 29, 1908 |
| 160,766 | Germany | May 26, 1905 |
| 218,327 | Switzerland | Mar. 16, 1942 |